(12) United States Patent
Wend et al.

(10) Patent No.: US 10,703,572 B2
(45) Date of Patent: Jul. 7, 2020

(54) CARRYING DEVICE FOR RECEIVING GOODS

(71) Applicant: Dürkopp Fördertechnik GmbH, Bielefeld (DE)

(72) Inventors: Michael Wend, Bielefeld (DE); Thomas Johannesmann, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 0 days.

(21) Appl. No.: 16/265,274

(22) Filed: Feb. 1, 2019

(65) Prior Publication Data

US 2019/0241366 A1 Aug. 8, 2019

(30) Foreign Application Priority Data

Feb. 5, 2018 (DE) .................. 10 2018 201 675

(51) Int. Cl.
*B65G 17/00* (2006.01)
*B65G 9/00* (2006.01)
*B65G 47/38* (2006.01)
*B65G 19/02* (2006.01)

(52) U.S. Cl.
CPC ........... *B65G 17/005* (2013.01); *B65G 9/002* (2013.01); *B65G 19/025* (2013.01); *B65G 47/38* (2013.01); *B65G 2201/02* (2013.01); *B65G 2201/0261* (2013.01)

(58) Field of Classification Search
CPC ........ B65G 19/025; B65G 9/00; B65G 9/002; B65G 9/004

USPC .......................................................... 198/704
See application file for complete search history.

(56) References Cited

U.S. PATENT DOCUMENTS

| 2,318,180 | A | 5/1943 | Morse |
| 3,464,733 | A | 9/1969 | Shaw |
| 3,629,905 | A | 12/1971 | Cote |
| 9,630,751 | B1 * | 4/2017 | Otto ............ B65G 17/20 |
| 10,065,800 | B2 | 9/2018 | Maur |
| 2017/0088302 | A1 * | 3/2017 | Auf Der Maur ....... B65B 43/42 |

FOREIGN PATENT DOCUMENTS

| DE | 10 2008 026 720 A1 | 12/2009 |
| DE | 10 2011 101 987 A1 | 11/2012 |
| EP | 3 147 240 A1 | 3/2017 |
| EP | 3 231 741 A1 | 10/2017 |
| WO | 96/29256 A1 | 9/1996 |

* cited by examiner

Primary Examiner — William R Harp
(74) Attorney, Agent, or Firm — McGlew and Tuttle, P.C.

(57) ABSTRACT

A carrying device for receiving goods, which comprises a carrying wall, having a front wall and a rear wall, and a closing device, having at least one closing structure for releasably connecting the front wall to the rear wall in a closed state. The carrying wall is here arrangeable between the closed state and an open state, wherein in the closed state, it delimits a carrying volume for receiving the goods at least partially to the front, bottom and rear, and wherein in the open state, it opens up the carrying volume in the downward direction. The at least one closing structure is arrangeable, in the open state, at a spacing from the carrying wall.

21 Claims, 5 Drawing Sheets

CARRYING DEVICE FOR RECEIVING GOODS

CROSS-REFERENCE TO RELATED APPLICATIONS

This application claims the priority of German Patent Application, Serial No. DE 10 2018 201 675.5 filed on Feb. 5, 2018, pursuant to 35 U.S.C. 119(a)-(d), the content of which is incorporated herein by reference in its entirety as if fully set forth herein.

FIELD OF THE INVENTION

The invention relates to a carrying device for receiving goods.

BACKGROUND OF THE INVENTION

From EP 3 231 741 A1, a carrying device for receiving goods, comprising a carrying wall and a closing device, is known. The carrying wall comprises a front wall and a rear wall and is arrangeable between a closed state, in which a carrying volume for receiving the goods is at least partially delimited to the front, bottom and rear, and an open state, in which the carrying volume is opened up in the downward direction. The closing device has two closing means for releasably connecting the front wall to the rear wall in the closed state. The two closing means are attached to the carrying wall. When the goods are released from the carrying device, goods of large dimensions, in particular, can tilt between the carrying wall and one of the two closing means. As a result, downtimes can ensue and the goods can fall out of the carrying device at a spacing from the intended unloading site and, at the same time, get lost or damaged.

SUMMARY OF THE INVENTION

The object of the invention is to improve a carrying device for receiving goods in such a way that it is robust during use and can be operated particularly economically.

This object is achieved by a carrying device for receiving goods, comprising a suspension device for linkage to a rail system, a carrying wall attached to the suspension device, which has a front wall and a rear wall, is arrangeable between a closed state and an open state, delimits a carrying volume for receiving the goods to the front, bottom and rear at least partially in the closed state, and opens up the carrying volume in the downward direction in the open state, a closing device having at least one closing means for releasably connecting the front wall to the rear wall in the closed state, wherein the at least one closing means, in the open state, is arrangeable at a spacing from the carrying wall. The essence of the invention consists in the fact that the closing device has at least one closing means for releasably connecting the front wall to the rear wall in the closed state, wherein the at least one closing means is arrangeable, in the open state, at a spacing from the carrying wall. The at least one closing means is mounted, in the open state, movably relative to the carrying wall. The at least one closing means can thus deflect the goods falling from the carrying wall. A tilting of the goods between the carrying wall and the at least one closing means is thus precluded. The carrying device is in particular configured for use in an overhead conveyor system. In particular, the carrying device can be part of an overhead conveyor system. The overhead conveyor system may have a rail system for attaching and conveying carrying devices in an in particular suspended manner. The carrying devices are each displaceable in the rail system in a guided manner by means of roll adapters. In particular, the overhead conveyor system may have a drive for driving the roll adapters along the rail system. The carrying device can thus be operated in a particularly reliable and economical manner.

The carrying device can have a suspension device for linkage to a rail system, in particular of the overhead conveyor system. Preferably, the carrying device is a transport bag of the overhead conveyor system. Preferably, the suspension device comprises a transport hook for fastening to the roll adapter of the rail system. The carrying device can have a loading frame. The loading frame can be connected, in particular rigidly, to the suspension device. Preferably, the goods can be introduced through the loading frame into the carrying volume. The carrying wall can be attached, in particular via the loading frame, to the suspension device. Advantageously, this means that the goods can be introduced particularly easily, in particular in an automated manner, into the carrying volume.

The carrying wall, in particular the front wall and/or the rear wall, can at least in some areas be configured rigidly. The rigidly configured region of the carrying wall, in particular of the front wall and/or the rear wall, can be rigidly connected to the suspension device, in particular to the loading frame. As a result of the increased stability of the carrying wall, the carrying device is guidable in a particularly precise manner along the rail system.

According to an aspect of the invention, the front wall and the rear wall are configured in the shape of the letter U in the closed state, in particular when seen from the side. For this purpose, the front wall and/or the rear wall can be configured as plane, flexible, in particular pliable, sheet material. Preferably, the front wall and/or the rear wall are at most provided with a single curvature in the closed state and/or in the open state. The carrying volume is preferably rectangular when seen from above. A bottom area of the carrying volume preferably has a V-shaped or U-shaped flute profile, which in particular extends horizontally. Cuboidal transport goods, in particular cardboard boxes, can therefore be received in the carrying device in a particularly reliable and space-saving manner. Preferably, the carrying wall, in particular the front wall and/or the rear wall, is configured such that, at least in some areas, it is flexible in shape. To this end, the carrying wall can have a textile and/or an elastomeric material. Preferably, the carrying wall is of pliable configuration. The carrying wall can thus adapt particularly well to the individual geometry of the goods. The goods are thus held particularly captively in the carrying volume.

According to an aspect of the invention, the carrying wall is made of a textile material entirely. A carrying device of this type ensures the captive transport of the goods. As a result of the configuration of the carrying wall, in particular the front wall and the rear wall, from a textile material, the goods, irrespective of their individual geometry or the geometry of the packaging, are particularly firmly and securely enclosed by the carrying wall. The carrying wall, in particular the front wall and/or the rear wall, can have a rubber lining, in particular on sides of the carrying volume, in order to increase a friction coefficient between the goods and the carrying wall.

Preferably, the at least one closing means is configured such that, for the releasable connection of the front wall to the rear wall, it bears against the carrying wall. For the connection of the front wall to the rear wall, the at least one closing means can have a non-positive connection, in particular a clamping connection, and/or a positive connection, in particular a pin-shaped connection and/or a tongue and groove connection and/or a keder connection and/or a locking bolt connection. Preferably, the front wall, in the closed state, makes contact with the rear wall. Alternatively, the front wall, in the closed state, can also be arranged at a spacing from the rear wall.

The at least one closing means can be rigid in shape. Preferably, the at least one closing means is rigid in shape in a region in which in interacts, in particular makes contact, with the carrying wall. The at least one closing means therefore ensures a particularly robust connection of the front wall to the rear wall.

Preferably, the at least one, in particular all, closing means is/are in the open state alterable in its/their position and/or orientation relative to the carrying wall. The at least one closing means can be attached, for instance releasably, to the carrying wall. In particular, the at least one closing means can be arrangeable as a separate clamping apparatus for the closure of the carrying wall at this clamp.

According to an aspect of the invention, the at least one closing means, in the open state, is arrangeable at a spacing of at least 5 mm from the carrying wall. A carrying device of this type ensures the release of the goods in a particularly reliable manner. The at least one closing means can thus be arranged at a spacing from the carrying wall such that a tilting of the goods between the carrying wall and the at least one closing means can be precluded in a particularly reliable manner. The at least one closing means can, in the open state, in particular be arranged at a spacing from an opening of the carrying device arranged at the bottom. In this manner, it is excluded that the closing means inadvertently blocks the opening, which might prevent the goods from automatically falling out of the carrying device due to gravity. Preferably, the at least one bearing means has a bearing length between the at least one closing means, in particular the at least one closing edge, and the attachment to the carrying wall of at least 5 mm, in particular at least 10 mm, in particular at least 50 mm, in particular at least 100 mm, in particular at least 250 mm, in particular at least 500 mm. Given the appropriate bearing length, in particular given an, at least in some areas, shape-flexible configuration of the at least one bearing means, a force which is necessary to move the at least one closing means relative to the carrying wall is particularly small. The at least one bearing means ensures that the at least one closing means can be moved away from the carrying wall in particular substantially free of transverse forces. A goods item falling out of the carrying device automatically in a downward direction is able to deflect the at least one closing means substantially without counterforces.

The closing device may have an actuating means for displacing the closing means from a closed position in an open position in which a connection between the front wall and the rear wall is released. Preferably, the actuating means comprises a triggering element, which is arranged at a spacing from the at least one closing means. The triggering element is preferably attached to the suspension device. The actuating means can therefore be actuated in a particularly simple manner, in particular in the region of the rail system. A pivoting movement of the carrying device when actuating the triggering means is reliably precluded due to the arrangement in the region of the suspension device.

According to an aspect of the invention, the closing device has two closing means, which are positively connectable to one another. For positive connection, the closing means may comprise a strip mechanism. Preferably, the strip mechanism has at least one closing strip, which is mounted rotatably. The at least one closing means therefore allows a particularly reliable connection of the front wall to the rear wall.

A carrying device configured such that the closing device comprises at least one bearing means, which is connected to the carrying wall and to which is attached the at least one closing means, is particularly easily movable from the open state into the closed state and is uncomplicated in terms of handling. The at least one closing means can be attached to at least one, in particular at least two, in particular at least three, in particular at least five, bearing means. Preferably, the at least one closing means is attached to in each case precisely one bearing means. The at least one bearing means can be attached directly to the carrying wall, in particular can be stitched and/or bonded and/or welded thereto. Alternatively, the at least one bearing means can be attached, in particular via the loading frame, to the suspension device. Preferably, the at least one bearing means extends fully on that side of the carrying wall that is facing away from the carrying volume. The at least one bearing means is in particular made of the same material as the carrying wall.

Preferably, the at least one closing means is connected non-positively, in particular by means of a clamping connection, and/or positively, and/or in an integrally bonded manner, to the at least one bearing means. As a result of the attachment of the at least one closing means to the carrying device, the said closing means is particularly easy to handle. The limitation of the movability of the closing means relative to the carrying wall, which limitation is associated with the linkage of the at least one closing means to the carrying device via the at least one bearing means, ensures an easier, in particular automated, transfer of the carrying wall from the open state into the closed state.

A carrying device configured such that the at least one bearing means is configured such that, at least in some areas, it is flexible in shape reliably ensures the release of the goods and is hence particularly robust during operation. As a result of the shape-flexible configuration of the at least one bearing means, the at least one closing means, in the open state, is limitably movable relative to the carrying wall. The at least one bearing means can be of pliable and/or stretchable configuration.

Preferably, the at least one bearing means comprises a textile material. The at least one bearing means can also wholly consist of a textile material. It is hereby ensured that, for moving the at least one closing means relative to the carrying wall, even small forces are sufficient. The goods can thus be reliably released from the carrying device.

The at least one bearing means can have a spring means, in particular a spring plate, in particular a leaf spring. Preferably, the at least one bearing means is configured such that the at least one spring means aids the moving of the carrying wall from the closed state into the open state. In particular, the at least one spring means is biased in the closed state. In particular, the at least one spring means can be configured such that, in the open state, it produces a spaced arrangement of the at least one closing means from the carrying wall.

A carrying device configured such that the at least one bearing means is attached to the carrying wall and/or to a loading frame of the carrying device is particularly easily, in particular automatably, movable from the closed state into the open state. The at least one bearing means can be non-positively and/or positively connected, in particular stitched, and/or integrally connected, in particular welded and/or bonded, to the carrying wall. As a result of the attachment of the at least one bearing means to the carrying wall, the arrangement of the at least one closing means relative to the carrying wall is at least partially defined, whereby the carrying wall is movable in a particularly reliable and accurately repeatable manner into the closed state. The at least one bearing means can have connecting loops, through which the loading frame extends at least in some sections. Preferably, the carrying wall also has such connecting loops for attachment to the loading frame. The carrying wall and the at least one bearing means can have mutually offset connecting loops for attachment to the loading frame.

A carrying device configured such that the at least one bearing means is attached to the carrying wall above a corresponding closing edge of the at least one closing means reliably ensures the release of the goods from the carrying volume, wherein the carrying wall is particularly easily, in particular automatably, movable from the open state into the closed state. The at least one closing means has in each case one closing edge, via which, in the closed state, it interacts with the carrying wall. Preferably, the closing edge is substantially straight. As a result of the attachment of the at least one bearing means above the respective closing edge of the at least one closing means attached to the at least one bearing means, the at least one closing means is particularly easily movable relative to the carrying wall. This applies, in particular, to a pliable version of the at least one bearing means. As a result of the attachment of the at least one bearing means above the at least one closing edge, it is ensured, moreover, that the at least one closing means, by force of gravity, assumes a fixed position relative to the carrying wall in so far as no further forces act on the said closing means. The carrying wall, in particular the at least one closing means, can thus be transferred in a particularly reliable and accurately repeatable manner into the closed state.

A carrying device configured such that the carrying wall projects downwards beyond at least one closing edge of the at least one closing means is transferable in a particularly reliable manner from the open state into the closed state. Due to the fact that the carrying wall projects downwards beyond the at least one closing edge of the at least one closing means, the closure of the carrying wall, in particular the clamping of the front wall and the rear wall between a front closing strip and a rear closing strip, can take place in a particularly reliable manner. Preferably, the carrying wall, in particular the front wall and/or the rear wall, has a projection portion, which projects downwards beyond the at least one closing edge. The carrying wall projects downwards beyond the at least one closing edge preferably in the open state.

A carrying device configured such that the carrying wall comprises at least one side wall, which laterally delimits the carrying volume at least partially, ensures a captive holding of the goods in the carrying volume. Preferably, the carrying wall comprises on both sides at least one, in particular at least two, in particular at least three, side walls. Preferably, the at least one side wall, at least in some areas or in all areas, is of shape-flexible, in particular pliable and/or elastic and/or foldable, configuration. The at least one side wall can be made of a textile material. Preferably, the at least one side wall comprises an elastomeric material. The at least one side wall can project downwards beyond the at least one closing means, in particular the at least one closing edge. Preferably, the at least one side wall is attached to the front wall and/or to the rear wall, in particular stitched and/or bonded and/or welded thereto. A lateral falling of the goods out of the carrying volume is thus reliably prevented.

A carrying device configured such that the carrying wall is configured as a tubular inner bag at least in sections can be emptied in a particularly robust and reliable manner. In the open state, the tubular inner bag is open preferably in the upward and downward directions. In particular, the tubular inner bag can be formed by the front wall, the rear wall and the two side walls. The inner bag is preferably rectangular when seen from above. The inner bag may have a projection portion, which projects downwards beyond the closing device, in particular the at least one closing means, in particular at least one closing edge. Preferably, the at least one closing means is arranged outside the inner bag. Advantageously, this ensures that the closing device does not interfere with an emptying of the carrying device. In particular, the inner bag protects the goods when falling out of the carrying device. A direct contact of the goods with the at least one closing means is prevented by the inner bag. In the open state, goods can be released downwards from the carrying device in a particularly reliable manner.

A carrying device configured such that the at least one closing means comprises a front closing strip and a rear closing strip, wherein these are fastenable to one another in order to connect the front wall to the rear wall, is transferable in a particularly reliable manner from the open state into the closed state, wherein the goods can be captively held in the carrying volume. Preferably, the front closing strip is attached to a front bearing means and/or the rear closing strip is attached to a rear bearing means. The front bearing means can be connected to the front wall and the rear bearing means can be connected to the rear wall. For the releasing of the connection between the front closing strip and the rear closing strip, these can be configured such that they are displaceable from the closed state, relative to one another, obliquely, in particularly perpendicularly, to a longitudinal extent of the carrying device.

A carrying device configured such that the front closing strip and the rear closing strip are fastenable to one another outside a lateral border of the carrying wall ensures the reliable release of the goods from the carrying volume. For the connection of the front closing strip to the rear closing strip, these can have a closing strip connecting means. The closing strip connecting means is preferably arranged outside a lateral border of the carrying wall. Advantageously, this means that the connecting means serving to connect the front closing strip and the rear closing strip, more particularly the closing strip connecting means, are arranged outside a space volume which is swept by the goods as they fall out. A jamming and/or catching of the goods is thus reliably prevented.

Into a carrying device configured such that a loading frame for arranging the front wall at spacing from the rear wall, said loading frame, in a suspended state of the carrying device, being arranged obliquely to a vertical plane, the goods can be introduced in a reliable and automatable manner. Preferably, the loading frame is connected rigidly to the suspension device. The loading frame can be connected articulately to the suspension device. Between the loading frame and the suspension device can be arranged a spring element for the oblique positioning of the loading frame relative to the vertical plane. Preferably, the loading frame, in particular in the suspended state and/or in the open state of the carrying device, is arranged at an angle of at least 10°, in particular at least 20°, in particular at least 30°, in particular at least 45°, to the vertical plane. A spacing, produced by the loading frame, between the front wall and the rear wall measures, in particular in the open state, preferably at least 10 mm, in particular at least 20 mm, in particular at least 50 mm, in particular at least 100 mm.

A carrying device configured such that the at least one side wall has a defined folding ensures a captive holding of the goods in the carrying volume and is stowable in a space-saving manner. The at least one folding is preferably oriented inwards, in the direction of the carrying volume. Preferably, the at least one folding is oriented in the vertical direction. The at least one side wall can have at least one, in particular at least two, in particular at least three, in particular at least five, foldings. The at least one folding can be predefined, for instance, by the attachment of the at least one side wall to the front wall and/or the rear wall. Through a surface-parallel stitching and/or bonding and/or welding of the at least one side wall to the front wall and/or the rear wall, the inwardly directed folding can be forced. A stitching and/or bonding and/or welding within the at least one side wall enables the adjustment of the number and/or orientation of additional foldings.

Further features, advantages and details of the invention emerge from the following description of an illustrative embodiment with reference to the figures.

DESCRIPTION OF THE PREFERRED EMBODIMENT

Figure 1:
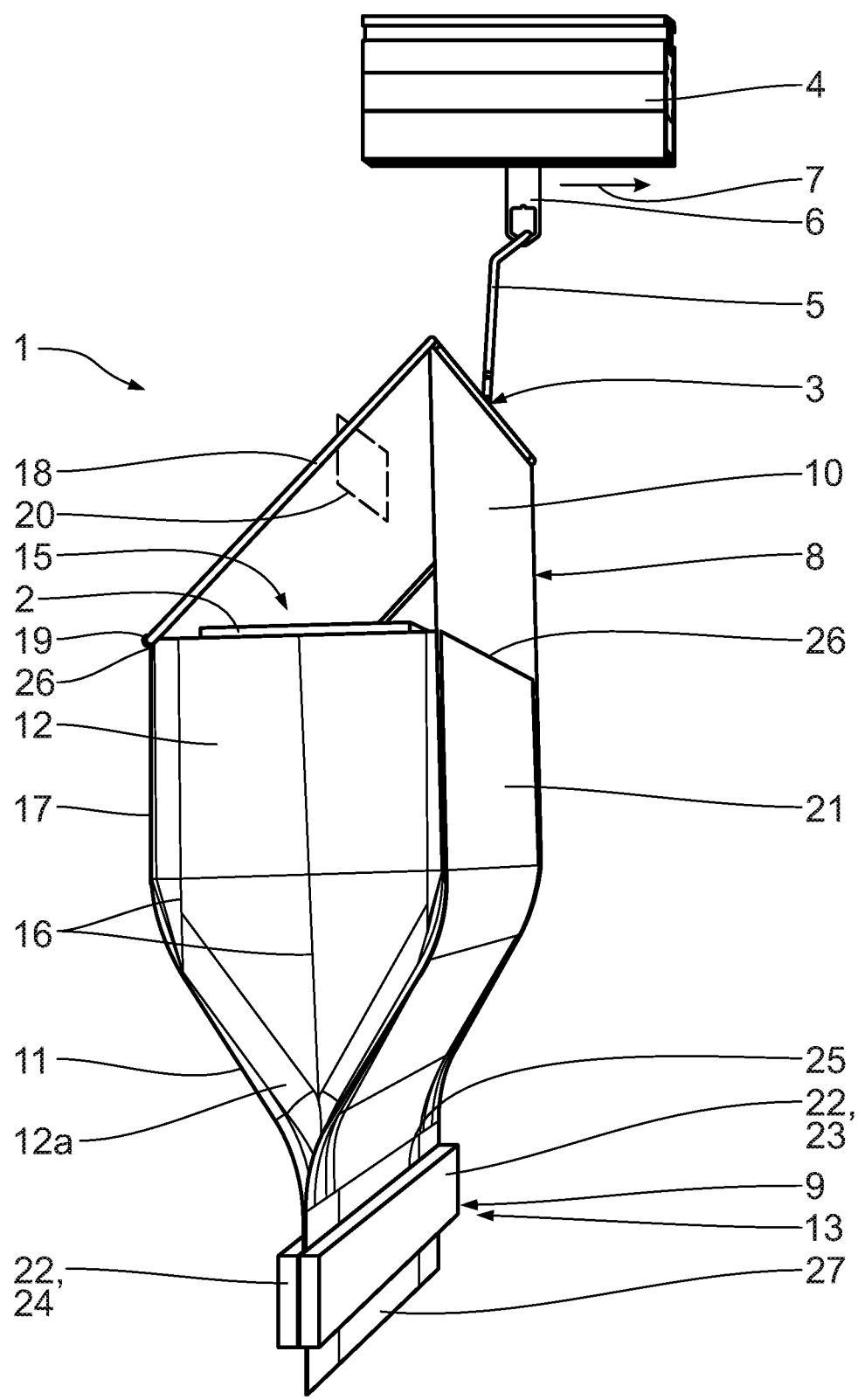
FIG. 1 shows a perspective representation of a carrying device obliquely from the front in a closed state.
Figure 2:
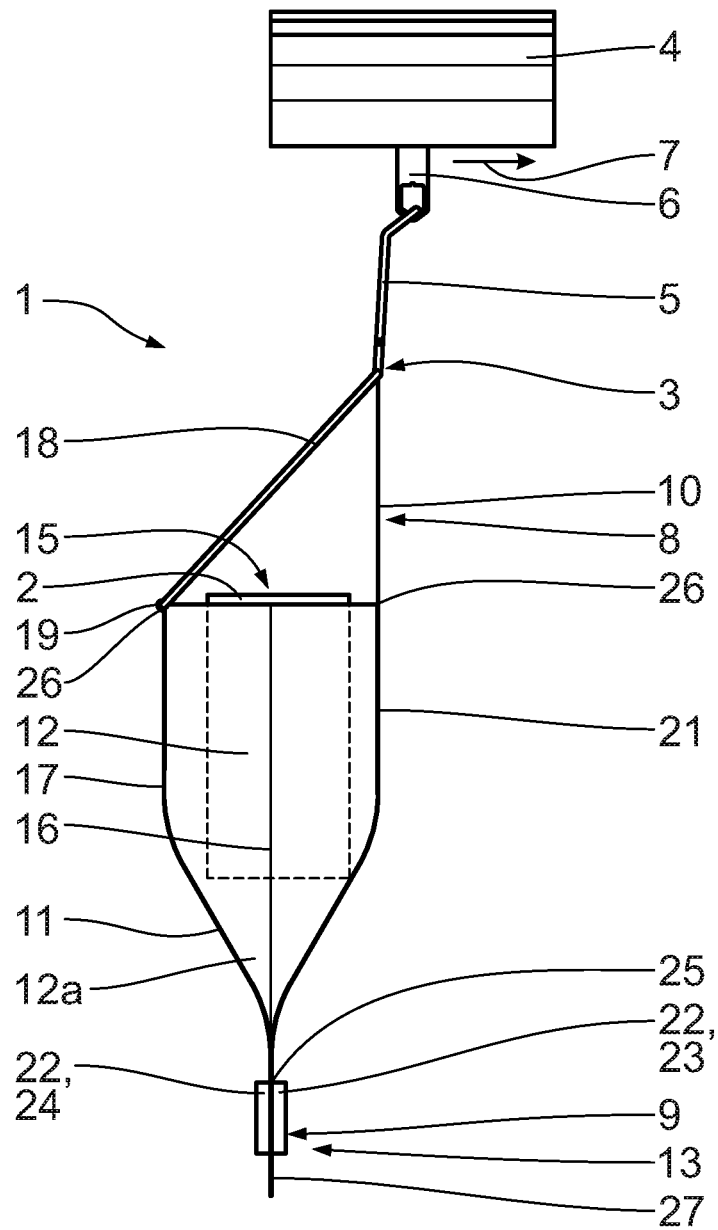
FIG. 2 shows a side view of the carrying device in FIG. 1 in the closed state.
Figure 3:
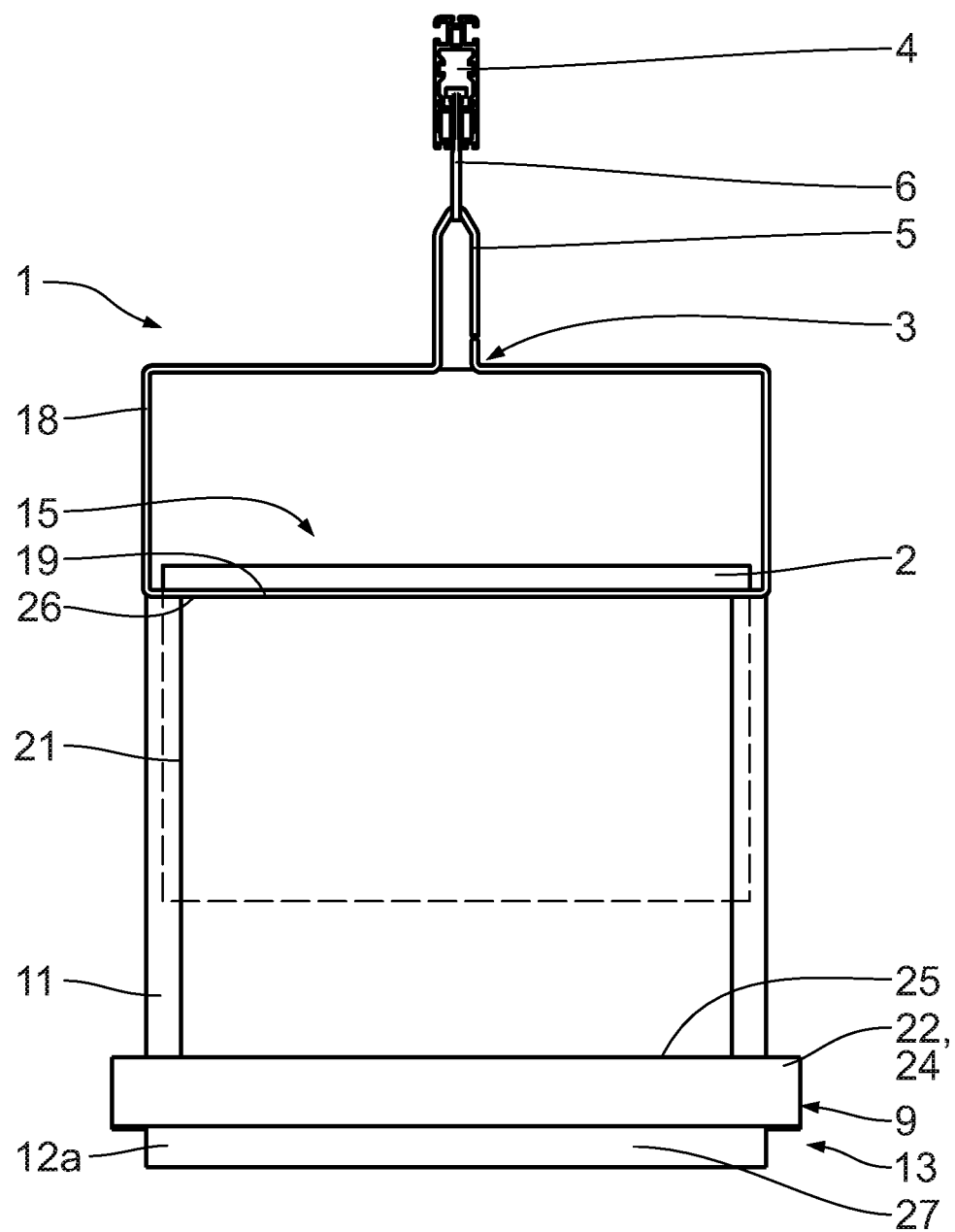
FIG. 3 shows a rear view of the carrying device in FIG. 1 in the closed state.

Below, an illustrative embodiment of a carrying device 1 for receiving goods 2 is described with reference to FIG. 1 to FIG. 5. The carrying device 1 is configured as a transport bag and attached to a rail system 4 by means of a suspension device 3. To this end, a transport hook 5 of the suspension device 3 engages in a roll adapter 6 of the rail system 4. The roll adapter 6 is mounted displaceably along a transport direction 7. For the transport of the carrying device 1 along the rail system 4, the roll adapter 6 is connected to a rail drive (not represented) of the rail system 4.

The carrying device 1 has a carrying wall 8 and a closing device 9.

The carrying wall 8 has a front wall 10, a rear wall 11 and two side walls 12. The front wall 10, the rear wall 11 and the side walls 12 form a tubular inner bag 12a. In the open state, this tubular inner bag 12a is rectangular when seen from above. The contour of the inner bag 12a when seen from above can also be in a different shape, in particular circular or oval or in any other polygonal shape. The carrying wall 8 is arrangeable in a closed state 13 and in an open state 14. In the closed state 13, the carrying wall 8 delimits a carrying volume 15 for receiving the goods 2 to the front, to the rear, to the sides and to the bottom. In the open state 14, the carrying wall 8 opens up the carrying volume 15 in the downward direction.

The carrying wall 8, in particular the front wall 10, the rear wall 11 and the two side walls 12, wholly consist of a textile material. The carrying wall 8 is thus configured such that it is flexible in shape.

The two side walls 12 are of foldable configuration. The two side walls 12 are respectively attached to the front wall 10 and to the rear wall 11. For moving the two side walls 12 from the open state 14 into the closed state 13, the respective side wall 12 is foldable, in particular along a vertical axis. A folding 16 of the side wall 12 is here configured such that this extends inwards in the direction of this carrying volume 15. This is achieved by an inwardly directed stitching 17 of the respective side wall 12 to the rear wall 11 and the front wall 10.

The carrying wall 8 is attached to the suspension device 3. To this end, the suspension device 3 has a loading frame 18. The loading frame 18 has a rectangular outline. The loading frame 18 is designed as a rectangularly bent wire. The loading frame 18 is rigidly connected to the transport hook 5. To a front longitudinal side of the loading frame 18 is attached the front wall 10. To a rear longitudinal side of the loading frame 18 is attached the rear wall 11. For the connection to the loading frame 18, the front wall 10 and the rear wall 11 have connecting loops 19, through which the loading frame 18 extends.

In particular in the suspended state of the carrying device 1, the loading frame 18 is arranged obliquely to a vertical plane 20. As a result of the oblique arrangement of the loading frame 18, the front wall 10 is arranged at a spacing from the rear wall 11, in particular in the region of the connecting loops 19.

The closing device 9 comprises two bearing means 21, and two closing means 22 respectively attached to the two bearing means 21. For the releasable connection of the front wall 10 to the rear wall 11 in the closed state 13, the two closing means 22 are configured such that they can be coupled to one another. The two bearing means 21 are respectively attached to the carrying wall 8. The two bearing means 21 are attached to the carrying wall 8 in the region of an upper end of the carrying volume 15.

The two bearing means 21 are made of a textile material. The two bearing means 21 are thus configured such that they are flexible in shape, in particular pliable. For the attachment of the respective bearing means 21 to the carrying wall 8, these are stitched together at a respective connecting point 26. Alternatively, the bearing means 21 can also be attached to the loading frame 18. In this case, the connecting point 26 would be arranged on the loading frame 18.

In particular, a connecting point 26 for each of the two bearing means 21 is respectively provided. The connecting points 26 are arranged, in particular, on the front wall 10 and on the rear wall 11, respectively in an upper region which is facing the loading frame 18. It is of fundamental importance that the connecting points 26 have a minimum spacing from the respective bottom edge of the closing means 22 such that the closing means 22 are arrangeable with sufficient spacing from the carrying wall 8 in the open state. The minimum spacing between the connecting points 26 is, in particular, at least 5 mm, in particular at least 10 mm, in particular at least 20 mm, in particular at least 50 mm, and in particular at least 100 mm, and in particular at least 200 mm.

The two bearing means 21 extend over the entire vertical dimension of the carrying volume 15. The two bearing means 21 respectively have a bearing length L between the respective closing means 22 and their fastening to the carrying wall 8. The two closing means 22 are attached via the respective bearing means 21 to one side of the carrying wall 8. In the open state 14, the two closing means 22 are thus mounted arrangeably at a spacing from the carrying wall 8. The spacing corresponds to the bearing length L.

The front closing means 22 in the transport direction 7 is configured in the form of a front closing strip 23. The rear closing means 22 in the transport direction 7 is configured in the form of a rear closing strip 24. For the connection of the front wall 10 to the rear wall 11 in the closed state 13, the front closing strip 23 and the rear closing strip 24 are releasably fastenable to one another. In the closed state 13, the carrying wall 8, in particular the front wall 10 and the rear wall 11, is arranged between the front closing strip 23 and the rear closing strip 24. The front wall 10 and the rear wall 11 are here clamped together, whereby the carrying volume 15 is delimited in the downward direction.

The front closing strip 23 and the rear closing strip 24 are fastenable to one another outside a lateral border of the carrying wall 8. To this end, the front closing strip 23 and the rear closing strip 24 project laterally beyond the carrying wall 8. A closing strip connecting means (not represented) for connecting the front closing strip 23 to the rear closing strip 24 is arranged outside the lateral border of the carrying wall 8.

The front closing strip 23 and the rear closing strip 24 each have a closing edge 25 for the clamping of the front wall 10 to the rear wall 11. The carrying wall 8 projects downwards beyond the two closing edges 25 of the closing means 22 with a projection portion 27. In particular, the carrying wall 8 projects downwards beyond the two closing means 22. The closure of the carrying wall 8 with the closing means 22 is uncomplicated. In particular, the exact length of the carrying wall 8 does not have to be adapted to the position of the closing means 22, which depends on the length of the bearing means 21 and/or the arrangement of the connecting points 26.

Figure 4:
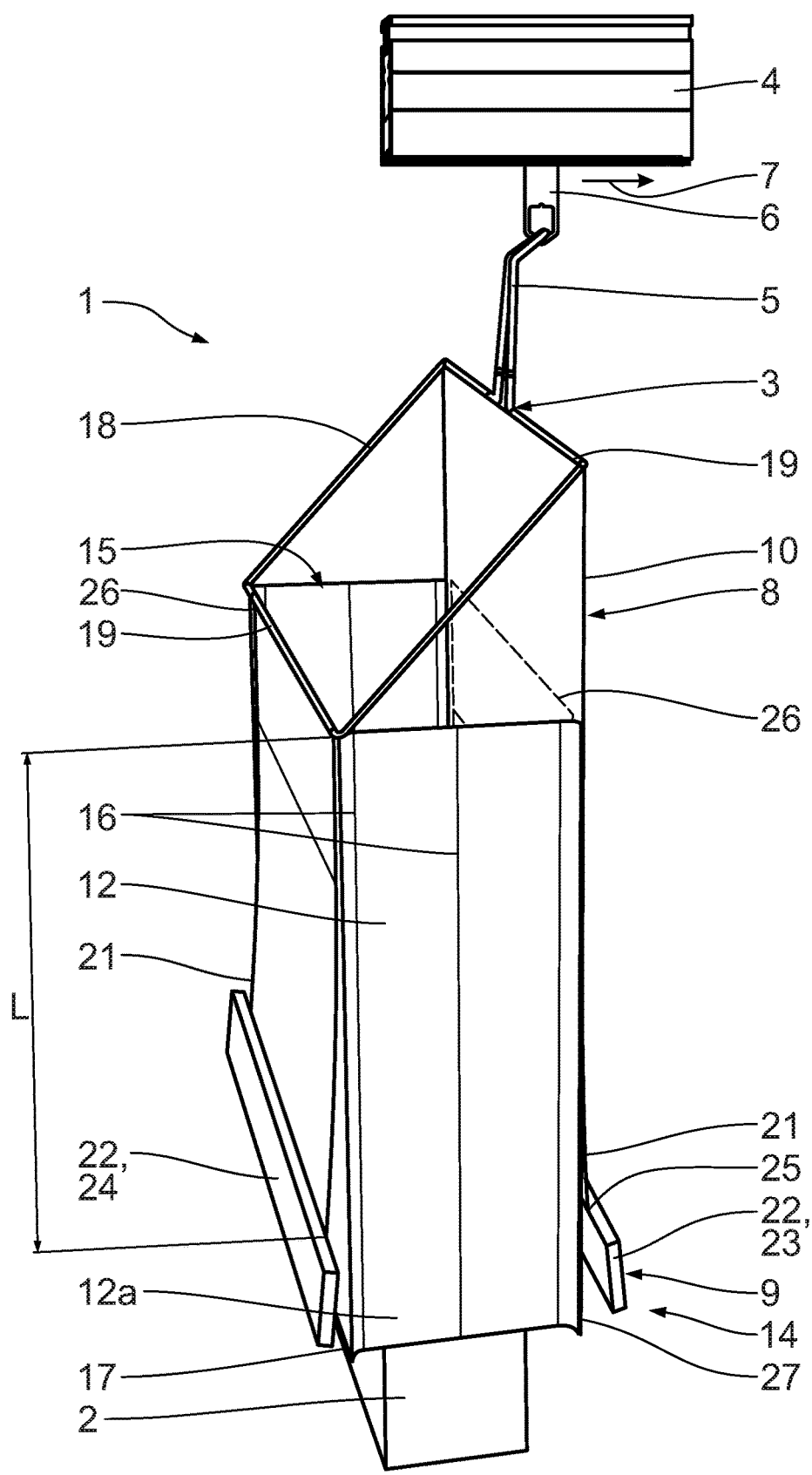
FIG. 4 shows a perspective representation of the carrying device obliquely from the rear, wherein the carrying device is represented in an open state.
Figure 5:
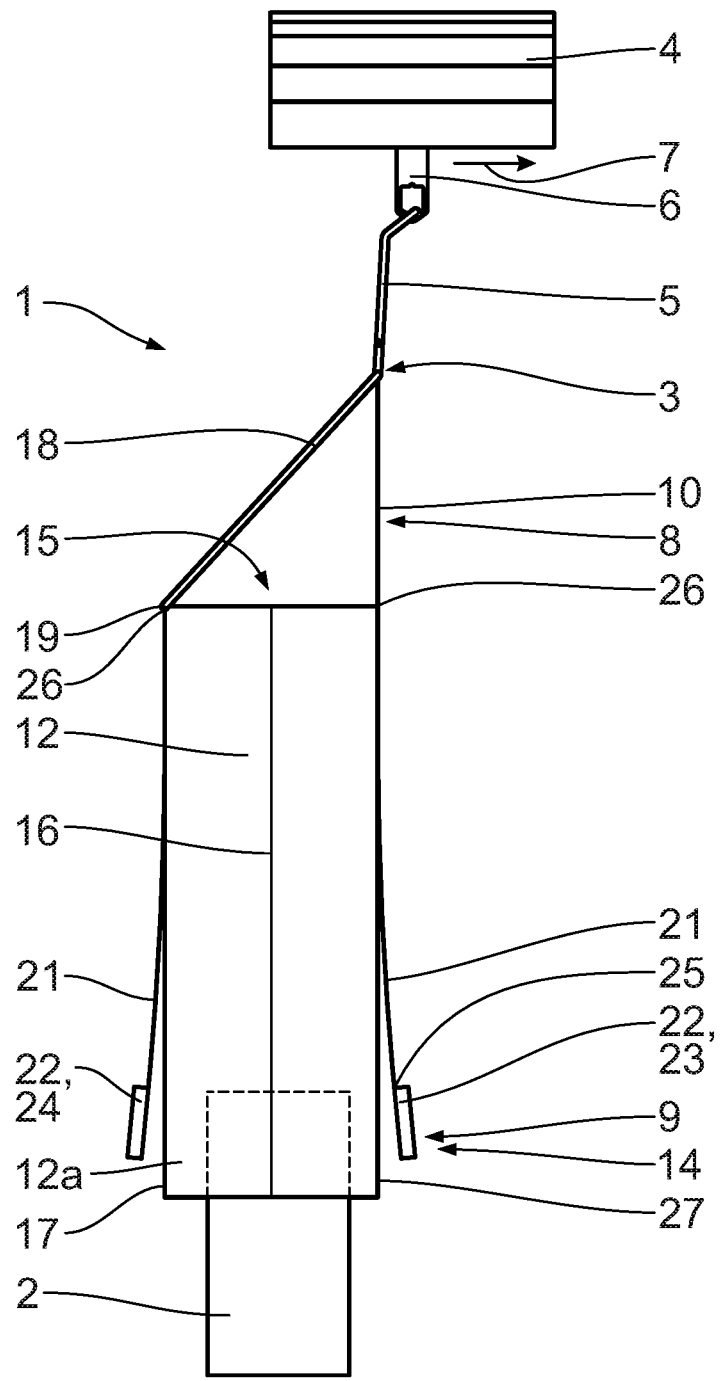
FIG. 5 shows a side view of the carrying device in FIG. 4 in the open state.

In FIG. 4 and FIG. 5, the carrying device is represented in the open state 14. The connection between the front closing strip 23 and the rear closing strip 24 is released and the carrying wall 8 opens up the carrying volume 15 in the downward direction. The bearing means 21 attached above the respective closing edges 25 to the carrying wall 8 ensure that the closing means 22 are arranged at a spacing from the carrying wall 8 in the open state 14. The two side walls 12 are free from tension over their entire vertical height and the foldings 16 are smoothed.

The working of the carrying device 1 for receiving the goods 2 is as follows:

The carrying device 1 is in the closed state 13 and is laden with a goods item 2. The front closing strip 23 and the rear closing strip 24 are attached to one another via the closing strip connecting means. Via the closing edges 25 of the front closing strip 23 and of the rear closing strip 24, the front wall 10 is clamped to the rear wall 11. In the carrying volume 15 is arranged the goods item 2.

Via the rail drive, the roll adapter 6 is moved along the rail system 4. The carrying device 1 suspended from the roll adapter 6 via the transport hook 5 is transported to an unloading station (not represented). In the unloading station, the closing strip connecting means is moved via an actuating means (not represented) into an open position, whereupon the connection between the front closing strip 23 and the rear closing strip 24 is released. The clamping of the carrying wall 8 arranged between the front closing strip 23 and the rear closing strip 24 is released.

Aided by the weight of the goods 2, the front closing strip 23 moves away from the rear closing strip 24, and the front wall 10 from the rear wall 11. The carrying wall 8 opens up the carrying volume 15 in the downward direction and is in the open state 14.

The goods item 2 falls by force of gravity downwards out of the carrying device 1, whereupon the closing means 22 can move away from the carrying wall 8. The closing means 22 can deflect flexibly along the transport direction 7 and counter to the transport direction 7. In particular, the closing means 22 are movable in and counter to the transport direction 7, substantially independently of the carrying wall 8. A tilting of the goods item 2 between the carrying wall 8 and one of the closing edges 25 of the opened closing device 9 is thus prevented.

By means of a closing system (not represented), the front closing strip 23 and the rear closing strip 24 are brought closer together, whereupon the carrying wall 8 is clamped between the respective closing edges 25. The closing strip connecting means is transferred into a closed setting and the front closing strip 23 is fastened to the rear closing strip 24. The carrying wall 8 is in the closed state 13.

By means of the rail drive, the carrying device 1 is transported along the transport direction 7 into a loading station (not represented). In the loading station, the carrying device 1 is furnished with a goods item 2 or a plurality of goods 2. To this end, the goods 2 are introduced by the loading frame 18 into the carrying volume 15. In particular, the carrying device 1 is furnished with precisely one goods item 2. The transport apparatus 1 serves, in particular, for the transport of single goods.

For the transport of the goods 2, the carrying device 1 can be transported back to the unloading station.

Because the two closing means 22 are attached via the two bearing means 21 to the carrying wall 8, it is ensured that the closing means 22, in the open state 14, are arrangeable at a spacing from the carrying wall 8. The carrying wall 8 can hereby be securely held in the closed state 13, wherein the release of the goods 2 from the carrying volume 15 is realized in a particularly reliable manner. A tilting of the goods 2 between the carrying wall 8 and a closing edge 25 of an opened closing means 22 can hereby be reliably prevented. The carrying device 1 is thus particularly robust and economical during operation.

What is claimed is:

1. A carrying device for receiving goods, comprising
a suspension device for linkage to a rail system,
a carrying wall attached to the suspension device, which
has a front wall and a rear wall,
is arrangeable between a closed state and an open state,
delimits a carrying volume for receiving the goods to the front, bottom and rear at least partially in the closed state, and
opens up the carrying volume in the downward direction in the open state,
a closing device having
at least one closing means for releasably connecting the front wall to the rear wall in the closed state,
wherein
the at least one closing means, in the open state, is arrangeable at a spacing from the carrying wall,
wherein the at least one closing means comprises a front closing strip and a rear closing strip, wherein these are fastenable to one another in order to connect the front wall to the rear wall,
wherein the front closing strip and the rear closing strip each have a closing edge for clamping the front wall to the rear wall, and wherein the carrying wall projects downwards beyond the two closing edges of the at least one closing means with a projection portion.

2. The carrying device according to claim 1, wherein the closing device comprises at least one bearing means, which is connected to the carrying wall and to which is attached the at least one closing means.

3. The carrying device according to claim 2, wherein the at least one bearing means is configured such that, at least in some areas, it is flexible in shape.

4. The carrying device according to claim 2, wherein the at least one bearing means is attached to at least one of the group comprising the carrying wall and a loading frame of the carrying device.

5. The carrying device according to claim 2, wherein the at least one bearing means is attached to the carrying wall above a corresponding closing edge of the at least one closing means.

6. The carrying device according to claim 1, wherein the carrying wall comprises at least one side wall, which laterally delimits the carrying volume at least partially.

7. The carrying device according to claim 1, wherein the carrying wall is configured as a tubular inner bag at least in sections.

8. The carrying device according to claim 1, wherein the front closing strip and the rear closing strip are fastenable to one another outside a lateral border of the carrying wall.

9. The carrying device according to claim 1, comprising a loading frame for arranging the front wall at a spacing from the rear wall, said loading frame, in a suspended state of the carrying device, being arranged obliquely to a vertical plane.

10. The carrying device according to claim 9, wherein the at least one side wall has a defined folding.

11. A carrying device for receiving goods, comprising
a suspension device for linkage to a rail system,
a carrying wall attached to the suspension device, which
has a front wall and a rear wall,
is arrangeable between a closed state and an open state,
delimits a carrying volume for receiving the goods to the front, bottom and rear at least partially in the closed state, and
opens up the carrying volume in the downward direction in the open state,
a closing device having
at least one closing means for releasably connecting the front wall to the rear wall in the closed state,
wherein the at least one closing means, in the open state, is arrangeable at a spacing from the carrying wall,
wherein the at least one closing means comprises a front closing strip and a rear closing strip, wherein these are fastenable to one another in order to connect the front wall to the rear wall, and
wherein the front closing strip and the rear closing strip are fastenable to one another outside a lateral border of the carrying wall.

12. The carrying device according to claim 11, wherein the closing device comprises at least one bearing means, which is connected to the carrying wall and to which is attached the at least one closing means.

13. The carrying device according to claim 12, wherein the at least one bearing means is configured such that, at least in some areas, it is flexible in shape.

14. The carrying device according to claim 12, wherein the at least one bearing means is attached to at least one of the group comprising the carrying wall and a loading frame of the carrying device.

15. The carrying device according to claim 12, wherein the at least one bearing means is attached to the carrying wall above a corresponding closing edge of the at least one closing means.

16. The carrying device according to claim 11, wherein the carrying wall projects downwards beyond at least one closing edge of the at least one closing means.

17. The carrying device according to claim 11, wherein the carrying wall comprises at least one side wall, which laterally delimits the carrying volume at least partially.

18. The carrying device according to claim 11, wherein the carrying wall is configured as a tubular inner bag at least in sections.

19. The carrying device according to claim 11, comprising a loading frame for arranging the front wall at a spacing from the rear wall, said loading frame, in a suspended state of the carrying device, being arranged obliquely to a vertical plane.

20. The carrying device according to claim 19, wherein the at least one side wall has a defined folding.

21. A carrying device for receiving goods, the carrying device comprising:
a suspension device configured to link to a rail system;
a front wall having a first and second end, said first end being connected to said suspension device;
a rear wall having a first and second end, said first end of said rear wall being connected to said suspension device, said second ends of said front and rear walls being movable between a closed state and an open state, said front and rear walls delimiting a carrying volume for receiving the goods;
a front closing strip mounted on said front wall at a front clamping location spaced from said first and second ends of said front wall;
a rear closing strip mounted on said rear wall at a rear clamping location spaced from said first and second ends of said rear wall, wherein said front and rear closing strips are configured to be fastenable to one another to connect said front wall to said rear wall in said closed state, said front closing strip and said rear closing strip each have a closing edge configured to clamp the front wall to the rear wall at said front and rear clamping locations in said closed state.

* * * * *